(12) United States Patent
Yu et al.

(10) Patent No.: US 9,103,975 B2
(45) Date of Patent: Aug. 11, 2015

(54) ORBITAL ANGULAR MOMENTUM

(71) Applicant: The University of Bristol, Bristol (GB)

(72) Inventors: Siyuan Yu, Bristol (GB); Mark Thompson, Bristol (GB); Xinlun Cai, Bristol (GB)

(73) Assignee: The University of Bristol, Bristol (GB)

( * ) Notice: Subject to any disclaimer, the term of this patent is extended or adjusted under 35 U.S.C. 154(b) by 0 days.

(21) Appl. No.: 14/404,602

(22) PCT Filed: May 29, 2013

(86) PCT No.: PCT/GB2013/051414
§ 371 (c)(1),
(2) Date: Nov. 28, 2014

(87) PCT Pub. No.: WO2013/179023
PCT Pub. Date: Dec. 5, 2013

(65) Prior Publication Data
US 2015/0123017 A1    May 7, 2015

(30) Foreign Application Priority Data
Jun. 1, 2012   (GB) .................................. 1209837.2

(51) Int. Cl.
*G02B 6/10*    (2006.01)
*G02B 6/124*   (2006.01)

(52) U.S. Cl.
CPC ..................................... *G02B 6/124* (2013.01)

(58) Field of Classification Search
CPC ........... G01R 33/62; A61B 2019/5231; A61B 2019/5251; G01N 24/006; G02B 27/0037; G02B 27/4244; G02B 27/425; G02B 6/124; G02B 6/12007

USPC ........ 250/492.1, 487.1; 359/34, 200.7, 204.5, 359/337.21; 315/39, 39.65
See application file for complete search history.

(56) References Cited

U.S. PATENT DOCUMENTS

| 5,274,720 A | 12/1993 | Yamamoto |
| 7,570,850 B1 | 8/2009 | Matsko et al. |

(Continued)

OTHER PUBLICATIONS

Gibson et al., "Free-space information transfer using light beams carrying orbital angular momentum," Optics Express, vol. 12, No. 22, Nov. 1, 2004.

(Continued)

*Primary Examiner* — Nikita Wells
(74) *Attorney, Agent, or Firm* — Vorys, Sater, Seymour and Pease LLP; Vincent M DeLuca (57) ABSTRACT

The invention relates to methods, devices, systems and uses of such systems for the generation and detection of electromagnetic fields carrying orbital angular momentum. An electromagnetic wave placed in a resonator having a closed-loop waveguide supporting a guided wave propagating at resonance with angular order, p, and with an angular grating patterned in the closed-loop waveguide, the angular grating having a integer number, q, of grating elements. The angular grating selectively couples the guided wave mode to a free space radiation mode having an OAM quantity, l, and out-of-plane wave vector component, krad,z, and wherein significant coupling to the grating occurs only when the following wave matching condition is satisfied: l=p−mq where: m is the diffraction order of the angular grating, m=1, 2, 3, . . . ,.

33 Claims, 5 Drawing Sheets

(56) References Cited

U.S. PATENT DOCUMENTS

| | | | |
|---|---|---|---|
| 2010/0282984 A1* | 11/2010 | Kreysing et al. | 250/492.1 |
| 2011/0230757 A1* | 9/2011 | Elgort et al. | 600/423 |
| 2012/0063484 A1 | 3/2012 | Goddard et al. | |
| 2012/0081120 A1* | 4/2012 | Elgort et al. | 324/322 |

OTHER PUBLICATIONS

Cai et al., "Integrated Compact Optical Vortex Beam Emitters," Science, vol. 338, pp. 363-366, Oct. 19, 2012.

Knoner et al., "Integrated optomechanical microelements," Optics Express, vol. 15, No. 9, Apr. 30, 2007.

Leach et al., "Interactive approach to optical tweezers control," Applied Optics, vol. 45, No. 5, Feb. 10, 2008.

Okida et al., "Nano-particles transportation using a holographic multiple-vortex tweezer," IEEE European Conference on Laser and Opto-Electronics, Jun. 14, 2009.

Yu et al., "Pure angular momentum generator using a ring resonator," Optics Express, vol. 18, No. 21, Oct. 11, 2010.

Zhu et al., "Theoretical model for angular grating-based integrated optical vortex beam emitters," Optics Letters, vol. 38, No. 8, Apr. 15, 2013.

* cited by examiner

ORBITAL ANGULAR MOMENTUM

FIELD OF THE INVENTION

The present invention relates to the generation and detection of electromagnetic fields carrying orbital angular momentum. In particular, the invention relates to methods, devices, systems and uses of such systems for the generation and detection of electromagnetic fields carrying orbital angular momentum.

BACKGROUND OF THE INVENTION

An electromagnetic field, and indeed a single photon, carries energy and momentum. The momentum may comprise two components. Linear momentum is responsible for the observable radiation pressure, whilst angular momentum is the rotation of the wave around its own axis as it propagates forward and is observable as a radiation torque. The angular momentum also comprises two components, namely spin angular momentum and orbital angular momentum (OAM). For a paraxial beam spin angular momentum is associated with polarization, whilst OAM is associated with the spatial field distribution.

Of particular interest is the origin independent internal OAM, which can be associated with a helical wavefront shape. In these helical modes the electromagnetic field has a helical wavefront shape with a central vortex such that the beam phase varies in a corkscrew-like manner in the beam propagation direction.

The OAM carried in such a field enables it to trap and rotate colloid particles and living cells as a so called "optical spanner" for use in biophysics, micromechanics or microfluidics. OAM also has the potential to be used in super-high optical data storage, imaging and metrology, or in free-space communications. More generally OAM has great potential for new and wide-ranging applications in both classic and quantum optics.

Current techniques for generating light carrying OAM using bulk optics, including computer generated holograms, spiral phase plates, q-plates and dove prisms, have limitations in terms of efficiency, cost, flexibility and scalability. These methods do not lend themselves to integration which is essential for widespread and large scale utilization in future applications.

SUMMARY OF THE INVENTION

A first aspect of the invention provides a method of generating electromagnetic radiation carrying orbital angular momentum (OAM). comprising placing an electromagnetic wave in a resonator having a closed-loop waveguide supporting a guided wave propagating at resonance with angular order, p, and with an angular grating patterned in the closed-loop waveguide, the angular grating having a integer number, q, of grating elements, wherein the angular grating selectively couples the guided wave mode to a free space radiation mode having an OAM quantity, l, and out-of-plane wave vector component, $k_{rad\ z}$, and wherein significant coupling to the grating occurs only when the following wave matching condition is satisfied:

$$l = p - mq$$

where:
m is the diffraction order of the angular grating, m=1, 2, 3, . . . ,.

A series of resonances will be formed at wavelengths that are an integer (p=1, 2, 3, . . . ) fraction of the length of the closed-loop. Alternatively at a particular resonance the closed-loop waveguide contains an integer number (p) periods of the electromagnetic wave in a full roundtrip in the resonator (or $2\pi$ azimuth angle). p is known as the azimuth angular order of the particular resonance. The total phase shift of the electromagnetic wave when propagating around the closed-loop waveguide is therefore $p \times 2\pi$.

Figure 1A:
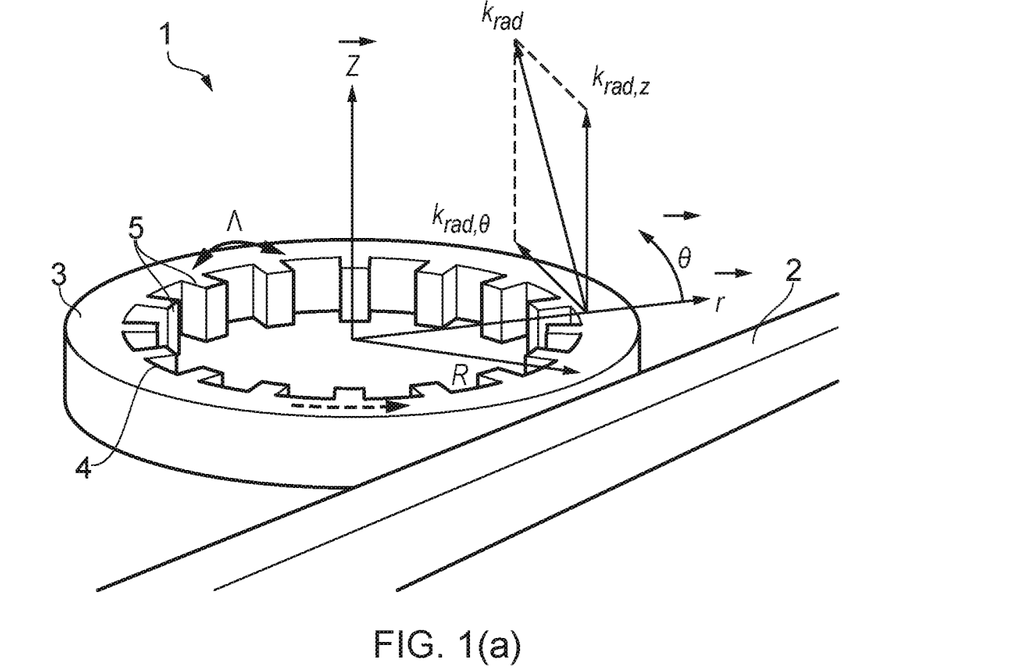

The angular grating is defined as a modulation of the waveguide material's geometry or dielectric constant in the azimuth angle direction. The angular grating may be a second order angular Bragg grating. An example of such a grating is shown in FIG. 1(a). In a typical embodiment the grating elements may be equally spaced in the angular direction, meaning that the phase shift of the electromagnetic wave between each grating element is constant.

The free space radiation mode is a beam of electromagnetic wave that has a propagation direction away from the closed-loop resonator. This beam will have a phase shift in the azimuth angular direction of $l \times 2\pi$, and its out-of-plane wave vector, $k_{rad,z}$, points away from the resonator. An electromagnetic wave beam having a phase shift $l \times 2\pi$ in the azimuth angular direction carries OAM, the quantity of which is characterised by the value of l.

The possible values of m is dependent upon the material refractive indices and structure of the waveguide and its surrounding media. In a typical embodiment m may take the value of 1 (unity).

The resonator may include a plurality of the angular gratings patterned in the closed-loop waveguide, each angular grating having a different integer number, q, of grating elements such that the free space radiation mode has a plurality of OAM quantities, l. It therefore becomes possible to generate EM radiation having a plurality of l values for a given wavelength.

The guided wave mode has an angular wave vector, $k_{guide}$, and the free space radiation mode has a wave vector, $k_{rad}$, with angular component, $k_{rad,\theta}$, and out-of-plane component, $k_{rad,z}$. The wave matching condition l=p−mq can therefore be translated to:

$$k_{rad,\theta} = k_{guide} - mq/R = k_{guide} - m2\pi/\Lambda$$

where:
R is the effective radius of the angular grating where it interacts with the guided wave,
$k_{guide} = p/R$, and
$\Lambda$ is the period of the angular grating at R.

In the case that the closed-loop waveguide resonator itself, or the guided wave in such a resonator, is substantially in a plane, the electromagnetic radiation carrying OAM may be a beam having a beam axis substantially perpendicular to the plane of the guided wave. When m=1, the electromagnetic radiation carrying nonzero OAM when l≠0 or p≠q has a helical wave-front.

The emitted electromagnetic radiation may have a helical wave-front inclined at an angle, $\phi$, to the guided wave plane normal.

The electromagnetic wave may be coupled into the closed-loop waveguide from a nearby input waveguide, preferably by evanescent coupling. The efficiency of the evanescent coupling may be maximised by providing the coupling ratio between the resonator and the input waveguide at the critical coupling point.

The electromagnetic wave may also be generated inside the closed-loop waveguide itself by an emission mechanism such as stimulated emission.

The electromagnetic wave in the closed-loop waveguide may be substantially TE polarized, or s-polarized, in which its electric field vector lies substantially in the plane of the guided wave resonance mode.

The method may further comprise controlling the amount of OAM, l, carried by the emitted beam.

The value of l may be controlled by means of tuning the wavelength of the electromagnetic wave so that its wavelength aligns with one or more of the resonance modes of the resonator, corresponding to one or multiple p values. Because the number of grating elements, q, is fixed in any pre-fabricated structure, changing the wavelength of the electromagnetic wave will change the value of p, which will in turn change the value of l. Therefore the tuning step may be used to control the OAM quantum number, l, of the electromagnetic radiation carrying OAM.

The method may further comprise tuning the resonance modes of the resonator, whilst maintaining the wavelength of the input electromagnetic wave substantially constant, wherein tuning the resonance modes of the resonator includes changing a refractive index and/or a dimension of the resonator such that the input wavelength aligns with one or more of the resonance modes, p, of the resonator. Thereby the value of l can be changed.

The method may further comprise tuning the wavelength of the electromagnetic wave, or the resonance of the resonator, so that l has a positive or a negative value.

The method may further comprise having electromagnetic waves that contain multiple wavelengths, each wavelength tuned to correspond with a resonance, p, of the resonator, so that multiple values of the OAM quantity l exist in the emitted beam simultaneously.

The method may further comprise having electromagnetic waves that propagate in the same closed-loop waveguide resonator in different directions, so that multiple values of the OAM quantity l exist in the emitted beam. In one example wherein the resonator is substantially in a plane, two electromagnetic waves propagate in the clock-wise and/or anti-clockwise directions of the resonator may result in the emitted beam having positive and/or negative l values.

The closed-loop waveguide may be a ring or a disc, or may be substantially spherical.

The method may be used to generate light carrying orbital angular momentum (OAM), wherein the resonator is an optical resonator and the electromagnetic wave is from a light source.

A second aspect of the invention provides a method of detecting or manipulating electromagnetic radiation carrying orbital angular momentum (OAM), the method comprising receiving incoming electromagnetic radiation carrying OAM at a resonator having a closed-loop waveguide with an angular grating patterned in the closed-loop waveguide, the angular grating having a integer number, q, of grating elements, wherein the angular grating selectively couples the incoming incident electromagnetic radiation having OAM quantity, l, and out-of-plane wave vector component $k_{rad\,z}$, from a free space mode to a guided wave mode propagating in the closed-loop waveguide at resonance with angular order, p. wherein significant coupling into the resonator occurs only when the following wave matching condition is satisfied:

$$l = p - mq$$

where m is a diffraction order of the grating, m=1, 2, 3, . . . ,.

The resonator may include a plurality of the angular gratings patterned in the closed-loop waveguide, each angular grating having a different integer number, q, of grating elements such that a plurality of OAM quantities, l, in the incoming incident radiation are each selectively coupled to a guided wave mode by the respective grating.

The method may further comprise coupling the guided wave from the closed-loop waveguide to a detector thereby detecting the incident electromagnetic radiation carrying OAM.

The step of coupling the electromagnetic wave from the closed-loop waveguide to the detector may be via an output waveguide, wherein the output waveguide is preferably evanescently coupled to the closed-loop waveguide.

The incident electromagnetic radiation carrying OAM may be a beam having a beam axis substantially perpendicular to the plane of the guided wave.

The incident electromagnetic radiation when carrying non-zero OAM such that p≠q or l≠0 may have a helical mode.

The closed-loop waveguide may be a ring or a disc, or may be substantially spherical.

The method may further comprise tuning the resonance modes of the resonator by changing a refractive index and/or a dimension of the resonator such that the incoming electromagnetic radiation of substantially constant wavelength is aligned with one or more of the resonance modes of the resonator whereby to selectively detect electromagnetic radiation carrying specific OAM quantum numbers, l.

The method may be used to detect light carrying orbital angular momentum (OAM), wherein the resonator is an optical resonator and the detector is a photo-detector.

A third aspect of the invention provides a device for generating and/or detecting and/or manipulating electromagnetic radiation carrying orbital angular momentum (OAM), the device comprising a resonator including a closed-loop waveguide for supporting a guided wave propagating at resonance with angular order, p, and with an angular grating patterned in the closed-loop waveguide, the angular grating having a integer number, q, of grating elements, wherein the angular grating is arranged to selectively couple the guided wave mode to a free space radiation mode having an OAM quantity l and out-of-plane component, $k_{rad\,z}$, and wherein significant coupling to the grating occurs only when the following wave matching condition is satisfied:

$$l = p - mq$$

where m is a diffraction order of the resonator, m=1, 2, 3, . . . ,.

The resonator may include a plurality of the angular gratings patterned in the closed-loop waveguide, each angular grating having a different integer number, q, of grating elements, and wherein each angular grating is arranged to selectively couple a guided wave mode to a free space radiation mode having a different respective OAM quantity, l.

The device may be capable of supporting a plurality of guided waves at resonance with angular order, $p_1, p_2, \ldots p_n$. The angular grating may be arranged to selectively couple the plurality of guided wave modes, $p_1, p_2, \ldots p_n$ simultaneously to respective free space radiation modes having an OAM quantity $l_1, l_2, \ldots l_n$, and out-of-plane component, $k_{rad\,z1}, k_{rad\,z2}, \ldots k_{rad\,zn}$, when the following wave matching condition(s) are satisfied:

$$l_n = p_n - m_n q$$

where $m_n$ is a diffraction order of the angular grating, $m_n$=1, 2, 3, . . . ,.

The device may therefore be arranged to radiate an emitted beam with an OAM quantity of $l_1$ substantially different from an incident beam OAM quantity $l_2$.

The device may further comprise an input/output waveguide for coupling an electromagnetic wave to/from the closed-loop waveguide, preferably by evanescent coupling.

The closed-loop waveguide may be a ring or a disc, or may be substantially spherical.

The resonator may be incorporated in an integrated circuit (IC).

The IC may include an array of the resonators.

The device may be micro sized, wherein R is less than 100 μm, preferably less than 50 μm, preferably less than 20 μm, preferably less than 10 μm.

The device may be adapted for generating light carrying OAM, wherein the resonator is an optical resonator and may further comprise a laser source coupled to the optical resonator.

The laser source may be tunable.

The device may be adapted for generating electromagnetic radiation carrying OAM, and may further comprise a polarization controller for coupling a TE polarized, or s-polarized, electromagnetic wave into the closed-loop waveguide, in which the electric field vector of the electromagnetic wave lies substantially in the plane of the guided wave.

The device may be adapted for detecting light carrying OAM, wherein the resonator is an optical resonator and the device may further comprise a photo-detector coupled to the optical resonator.

A further aspect of the invention provides an optical tweezer system including a device according to the invention for generating light carrying OAM.

A further aspect of the invention provides use of the optical tweezer system to hold and/or move an object by energizing the device to generate light carrying OAM.

A further aspect of the invention provides a communications system including at devices according to the invention for generating electromagnetic radiation carrying OAM and for detecting the electromagnetic radiation carrying OAM.

In the communications system the electromagnetic radiation carrying OAM may be used to encode quantum information in a quantum communications channel or may be used in a quantum key distribution system.

The communications system may further comprise a plurality of the devices for generating/detecting electromagnetic radiation carrying OAM.

The communications system may further comprise at least one optical interconnect between the devices.

The communications system may further comprise an optical bandpass filter and/or a optical multiplexer.

A further aspect of the invention provides a micro-fluidic system including at least one device according to the invention, wherein the device is adapted to rotate microspheres or microparticles within the micro-fluidic system when the device(s) are energized to generate electromagnetic radiation carrying OAM.

A further aspect of the invention provides use of the microfluidic system for sorting different microspheres or microparticles according to type.

A further aspect of the invention provides use of the microfluidic system as a micropump for displacing microspheres or microparticles through the system.

A further aspect of the invention provides use of a device according to the invention having an array of the resonators, for beam steering.

A further aspect of the invention provides use of a device according to the invention having an array of the resonators for coherent or incoherent combining of multiple OAM states generated by the resonators.

BRIEF DESCRIPTION OF THE DRAWINGS

Embodiments of the invention will now be described with reference to the accompanying drawings, in which:

FIG. 1 (a) illustrates schematically a micro-ring optical resonator having a closed-loop waveguide patterned with an angular grating, and a linear waveguide for evanescently coupling tunable input laser light into the closed-loop waveguide;

FIG. 1 (b) illustrates schematically the helical wave-front of the radiated wave generated by coupling a guided wave to the angular grating;

FIGS. 2 (a) and (b) illustrate a scanning electron microscope image of the optical resonator showing the elements of the grating patterned along the inside wall of the micro-ring cavity;

FIG. 3 (a) illustrates an experimental setup for detecting radiation carrying OAM generated by the optical resonator embodied in a silicon-on-insulator photonic integrated circuit;

FIG. 3 (b) illustrates a measured radiation spectrum obtained from the experimental setup shown in FIG. 3 (a) and showing peaks corresponding to the topological charge (quantum states), l, of the radiation carrying OAM;

FIG. 3 (c) illustrates interference patterns captured by the infra red camera in the experimental setup shown in FIG. 3 (a) when the wavelength of the tunable laser is adjusted to multiple resonances of the optical resonator to show the interference patterns at the different OAM topological charges;

DETAILED DESCRIPTION OF EMBODIMENT(S)

FIG. 1 (a) illustrates an optical resonator 1 including an input straight (linear) waveguide 2 and a closed-loop ring waveguide 3. An angular grating 4 is patterned within the ring waveguide 3. The angular grating is used to selectively couple a guided wave propagating in the ring waveguide with an in-plane angular wave vector to a free space radiation mode with a wave vector pointing at an angle from the waveguide plane.

The ring waveguide 3 is an example of a substantially planar waveguide structure that provides strong confinement of light that propagates around the ring by way of total internal reflection. At one or more resonant wavelengths of the ring waveguide 3 constructive interference occurs which develops the intensity of the guided wave propagating in the waveguide as it executes multiple circuits of the ring. Light is coupled into the ring waveguide 3 evanescently from the input waveguide 2. Efficient coupling from the input waveguide to the ring waveguide 3 is achieved at the critical coupling point where maximum power is transferred from the input waveguide 3 into the ring. If the ring waveguide also has a high Quality factor then a highly efficient optical system can be devised.

The ring waveguide 3 is perturbed by the angular grating 4 patterned along the inside wall of the ring cavity. The radius of the ring is R, and the period of the angular grating at R is Λ. Thus the number of the angular grating elements, q, is an integer given by $q=2\pi R/\Lambda$. The angular grating is a second order grating in which the waveguide 3 is perturbed with a period close to the wavelength of the guided wave. The incoming guided wave is scattered by each and every grating element 5 acting as a phased radiation source, so that a waveguide mode with an in-plane wave vector is coupled to a free space radiation mode with a wave vector pointing away from the waveguide plane normal, in which constructive interference occurs.

Figure 1B:
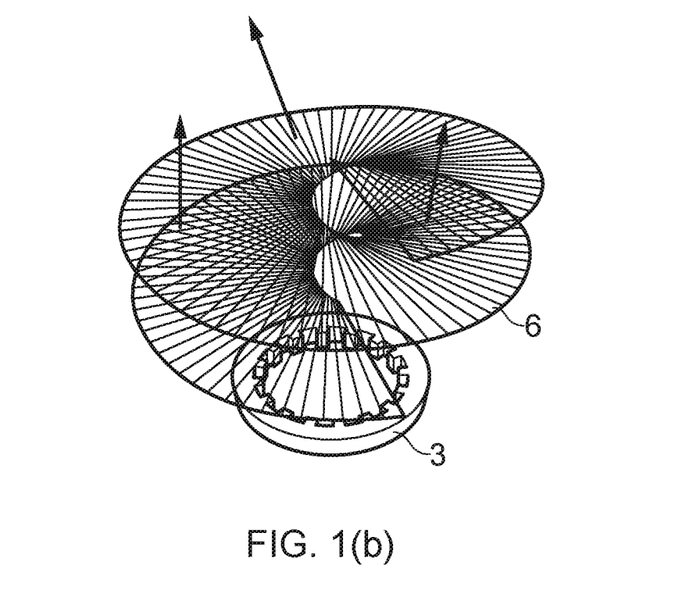

Vertical emission (in the z direction normal to the waveguide plane) is achieved when the grating period, $\Lambda$, coincides with the wavelength of the guided wave, so that all grating elements 5 radiate in-phase. When the radiation from the consecutive grating elements are not in phase, the radiated light 6 is oblique as the wave-front is skewed to fulfil the Bragg condition. Since the waveguide 3 carrying the grating 4 is a ring, the wave-front of the diffracted field skews in the angular direction, $\theta$, and transforms to a helix, as shown in FIG. 1 (b). As mentioned previously, a helical wave-front is associated with OAM.

The mode coupling mechanism in the angular grating 4 is directly derived by coupled mode theory (CMT) in cylindrical coordinates to show that significant mode coupling only takes place between a guided mode and a radiation mode when the following angular phase matching condition is satisfied:

$$l = p - mq$$

which translates into $$k_{rad,\theta} = k_{guide} - mq/R = k_{guide} - m2\pi/\Lambda$$

where:
R is the effective radius of the angular grating where it interacts with the guided wave
$k_{guide}$ is the (in-plane) projection of the wave vector of the guided wave in the angular (tangential) direction at radius R
$k_{rad,\theta}$ is the projection of the wave vector, $k_{rad}$, of the free space radiation mode in the angular (tangential) direction at radius R, and
m is the diffraction order of the resonator, m=1, 2, 3, . . . ,.
The field in the ring resonator needs to fulfil the self-consistent resonance condition:

$$2\pi R k_{guide} = 2p\pi$$

where p is the angular order of the guided wave in the resonator, p=±1, ±2, etc
Therefore a quantized projection of the wave vector in the angular direction for the radiation mode is provided:

$$k_{rad,\theta} = (p - q)/R = l/R$$

where l is an integer, and l=p−q.

The radiation mode wave vector has no angular component, i.e. $k_{rad,\theta}$=0 or l=0 when p=q, while it contains nonzero angular component when p≠q. Therefore, the radiation mode contains the angular transverse phase factor $\exp(-ik_{rad,\theta} R\theta) = \exp(-il\theta)$, indicating an OAM of lh per photon, where h is the reduced Planck constant. l, known as the OAM quantum number or topological charge, is determined by the difference between the guided wave angular order p and the number of angular grating elements, q.

The guided waves in the ring resonator are essentially angular propagating waves carrying ph OAM per photon. The physical meaning of the equation, l=p−q, is that the angular grating 4 diffracts the guided wave by changing the OAM by an amount of qh. For a fabricated device, q is a constant while p is different at different resonances. Therefore variable OAM quantum numbers, l, can be generated by simply tuning the injected laser wavelength to various resonance, or alternatively tuning the micro-ring resonances, by changing refractive index of the waveguide, with a fixed input wavelength.

Figure 2A:
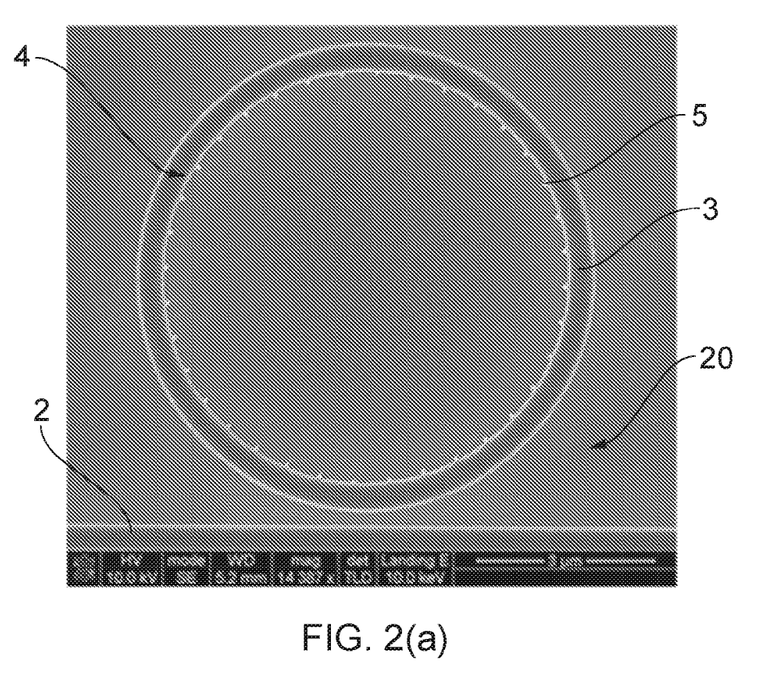
Figure 2B:
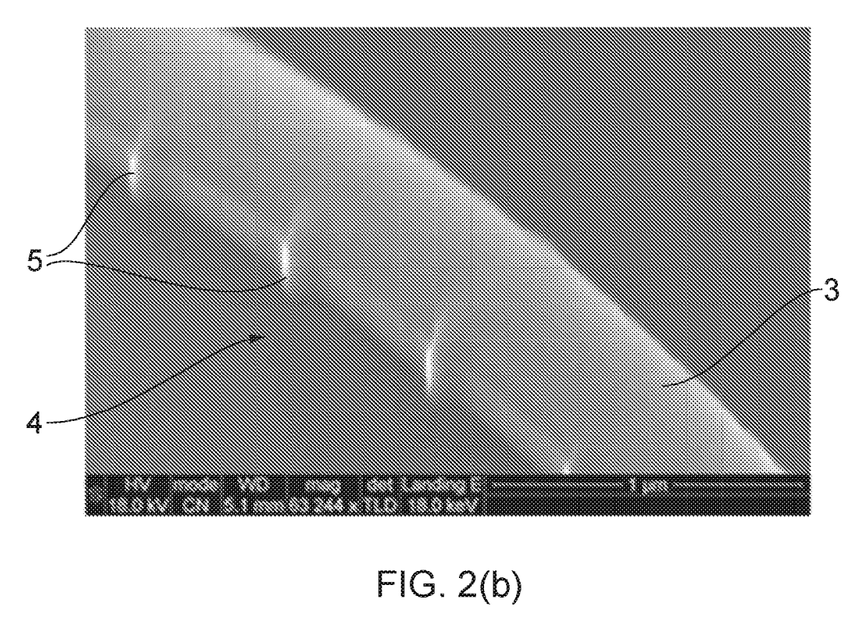

FIGS. 2 (a) and (b) illustrate a scanning electron microscopy (SEM) image of an optical ring resonator fabricated on a silicon-on-insulator (SOI) photonic integrated circuit (PIC) 20. Both the input straight waveguide 2 and the ring waveguide 3 are 500-nm wide and 220-nm thick. The gap between the ring and the straight waveguide is 200 nm, and the straight waveguides are tilted 7° from the normal of the chip facets to reduce the Fabry-Perot effects induced by optical reflection from the facets. The structures are defined using electron-beam lithography followed by inductively coupled plasma etching. Following the etching, a 300-nm-thick silicon dioxide layer is deposited onto the wafer to encapsulate the waveguides. The radius of the ring and the pattern of the angular grating 4 were designed in such a way that the resonance wavelength associated with zero quantum number OAM (l=0) is around 1550 nm.

A plurality of different sized micro-ring resonators were fabricated on the same chip 20. Exemplary micro-ring resonators have radius of 3.9 μm and 7.5 μm, with 36 and 72 angular grating elements, respectively. This gives rise to a value for the angular order, p, of the guided wave that is typically large. For example, in a 10 μm radius SOI microring resonator, p is about 140 at 1550 nm. For SOI material, m=1 around the wavelength of 1550 nm.

In principle, a plurality of modes may be involved as long as their angular wave vectors are matched for some integer m. However, the practical value for m may be limited by the used material system due to the limitations imposed by the refractive index of the waveguide material as will be explained below.

The free space radiation has wave vector $k_{rad}=2\pi/\Lambda$, where $\Lambda$ is the free space wavelength. The angular component of the free space wave vector, $k_{rad,\theta}$, must therefore satisfy:

$$|k_{rad,\theta}| < 2\pi/\Lambda$$

Also, the guided wave vector, $k_{guide} = n_{eff}(2\pi/\Lambda)$, where $n_{eff}$ is the effective refractive index of the waveguide material.

Based upon the above described angular grating wave matching condition:

$$k_{rad,\theta} = k_{guide} - m2\pi/\Lambda$$

reveals that for a wavelength $\lambda$ of around 1550 nm, with $\Lambda$ at around 450 nm and $n_{eff}$ around 3.5, m is in the order of 0.8 to 1.6. Since m is an integer the only possible value for m is 1.

The grating elements 5 are in the shape of 'nano-teeth' protruding from the inner wall of the ring.

Figure 3A:
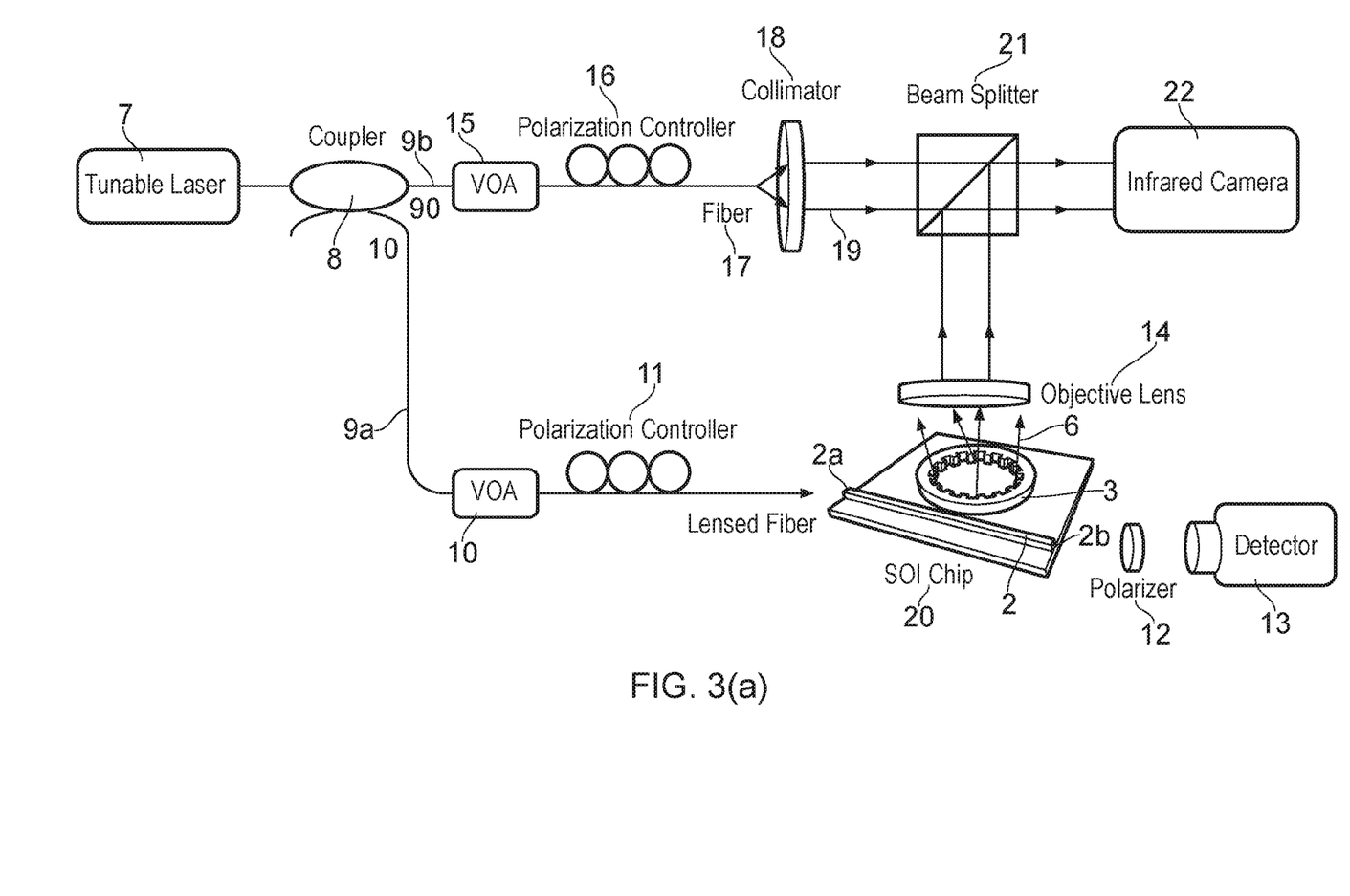

An experimental arrangement based on a Mach-Zehnder interferometric configuration, shown in FIG. 3 (a), was used to study the phase structure of the radiation beam. The output of a high precision tunable laser 7 was split into two branches using a fibre coupler 8. The laser 7 outputs a near Gaussian paraxial beam with cylindrical symmetry. In one branch 9a the laser power was coupled into one port 2a of the PIC 20 straight waveguide 2 using a tapered fibre lens tip, with suitable power levels controlled by a variable optical attenuator (VOA) 10. A fibre-optic polarization controller 11 was used to launch light in the quasi-TE mode in the waveguide 3 (E-field in waveguide plane). With a planar waveguide, launch at TE polarisation is required as TM mode will not emit vertically out of the waveguide plane. In order to monitor the polarization, a polarizer 12 followed by an optical power meter 13 is arranged at the output port 2b of the waveguide 2. When the laser wavelength coincides with a resonance of the micro-ring 3, the radiation beam 6 is emitted, and then collimated by an objective lens 14.

In the other branch 9b, the power level was replicated by another VOA 15 and polarization controller 16, and the laser power coming out of a flat-end fibre 17 is directed to a collimator 18 in order to produce an expanded and collimated Gaussian reference beam 19. The two beams are combined at a beam splitter 21 and projected onto an infrared camera 22.

Figure 3B:
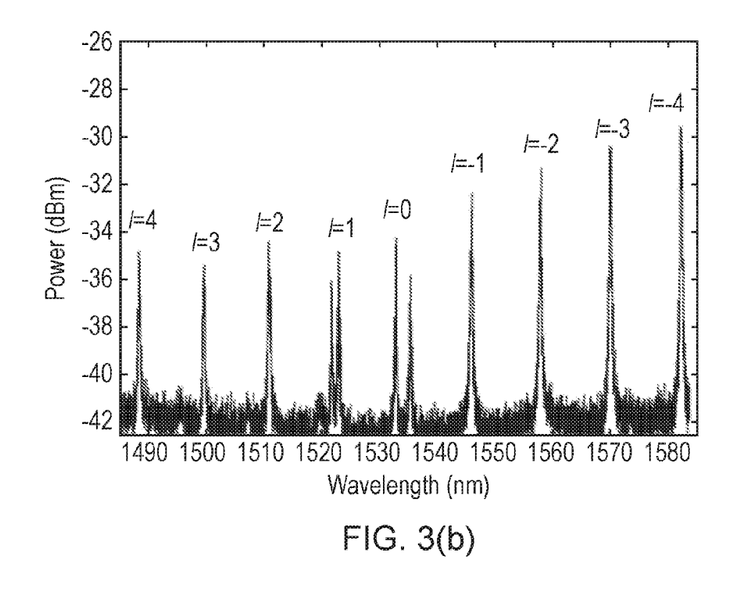

FIG. 3 (*b*) shows the radiation spectra for the fabricated SOI device 20, measured by replacing the infrared camera 22 with an optical power meter (not shown). The doublets in the spectra result from eigen-mode splitting caused by coupling between the otherwise degenerate clockwise and counterclockwise travelling-wave modes in the ring 3. The coupling is due to back-reflection of the grating elements 5, which could be minimised with refinement of the grating design.

Figure 3C:
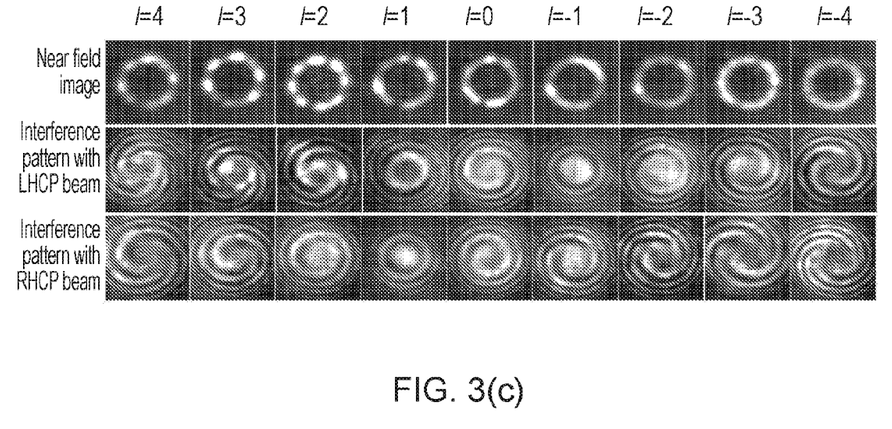

FIG. 3 (*c*) shows photographs of interference patterns associated with a left-hand and right-hand circularly polarised reference beam, with the different resonant wavelengths for the 3.9 μm radius device 20. Of these the middle one shows the special case of l=0, while the others show l=−4 to +4. In real time the spiral patterns can be observed to rotate when the phase of the Gaussian reference beam is changed continuously, confirming that the wave-front of the light radiated from fabricated device 20 is indeed helical with l=p−q.

Theoretically, radiated beams with any OAM quantum numbers l can be generated from the device 20. However, the observable OAM is limited by the tuning range of the tunable laser 7, which in the setup shown in FIG. 3 (*a*) was 1460-1570 nm. Higher quantum numbers of OAM can be observed from larger devices because of their smaller free spectral range. For example, with a ring radius of 7.5 μm, the spiral fringe patterns associated with l=−3 to +3 were observed, as expected, on the shorter and longer wavelength side, respectively.

The integrated OAM emitters have therefore successfully been realized in CMOS-compatible SOI PICs.

Compared to previous techniques, the invention enables multiple OAM values to be selectively generated, and rapid switching among them can be easily achieved, as the silicon micro-rings 3 have already been shown to tune at frequencies up to 10 GHz. With larger ring resonators tuning in the THz region is achievable.

The radiated beams 6 always possess integer quantized OAM, while the non-integer value OAM beam (with wavelengths between micro-ring resonances) is always rejected. The device 20 can be scaled to generate radiation beams carrying OAM with very large quantum numbers by carefully choosing the structure parameters.

In the above arrangement a micro-ring 3 optical resonator is used in the device 20. However, it will be appreciated that other optical resonators may be used such as a micro-disc, or spherical resonator. What is important is the waveguide forms a closed loop.

A micro-disc cavity can be made from a planar waveguide by etching a circular sidewall that penetrates the waveguide core layer. This structure provides strong confinement of light in the so-called whispering gallery mode (WGM) which travels along the circumference of the micro-disc by way of total internal reflection at the sidewall. In the fundamental mode with a micro-disc of high Quality factor the only significant propagation term in the WGM is the wave-vector in the angular direction. By patterning an angular grating in the sidewall of the micro-disc cavity, similar to that described above for the micro-ring, selective coupling between the guided WGM and a free space radiation mode carrying quantized OAM states can be realised. Alternatively, other grating designs could be implemented, such as patterning on the top of the microdisc.

A micro-sphere resonator is a non-planar waveguide that can support a plurality of bound guided planar waves in different respective planes. A micro-sphere may open the possibility to provide a plurality of different angular gratings patterned in the inside wall of the spherical cavity for tuning the micro-sphere at different resonances.

Light may be coupled into the micro-disc or micro-sphere using a linear waveguide as described previously. With the micro-sphere a plurality of input waveguides may be provided aligned with each angular grating. It is not necessary that the input waveguide need be provided adjacent the resonator in the plane of the micro-ring or micro-disc. Alternatively, the input waveguide may be arranged above or below the plane the micro-ring or micro-disc. Evanescent coupling approaching or at the critical coupling point is well understood and will not be elaborated here so as to avoid obscuring the clarity of the invention.

The micro-ring device 20 described above is operated as an optical resonator with a laser light source. However, it will be appreciated that the invention is not particularly limited to optical resonators and the principles of the invention apply throughout the electromagnetic spectrum, e.g. in the radio frequency, or THz regions.

The angular grating patterned in the resonator can take a variety of forms and is not limited to the 'nano teeth' described for exemplary the micro-ring structure. The grating may take any tooth like or crenulated form, or may be include a series of rods, for example.

For on-chip applications a variety of different substrate materials may be used as an alternative to the silicon-on insulator arrangement described above. For example, the substrate material may be include any one or more of: compound semiconductors (GaAs/AlGaAs, InGaAsP/InP, etc), polymers, silicon oxynitride (SiON)/silicon dioxide, silicon dioxide (doped)/silicon dioxide, AlGaN/InGaN/GaN, lithium niobate, diamond thin films, etc. as will be appreciated by those skilled in the art. As mentioned previously the material selection has implications for the diffraction order, m, of the wave matching condition of the angular grating.

It is possible to excite several guided wave modes at the same time in the device. The outgoing beam will therefore be a frequency division multiplexed (FDM) OAM beam, with different frequencies carrying different OAM. Such a beam can be decoded using simple optical bandpass filters to separate different OAM.

In addition to tuning the emitted radiation carrying OAM by simply tuning the input laser source, this may also be realised by tuning the micro-ring refractive index or ring diameter R when the input light frequency is fixed, achieving the same control over the output beam OAM. This tunes the resonance modes of the resonator such that the input wavelength aligns with one or more of the resonance modes of the resonator.

By the principle of reciprocity, an emitter of an out-going beam with a certain OAM will also couple the same incoming beam back into the resonator. Hence the same device 20 can be used as an OAM-selective receiver. The evanescently coupled straight waveguide 2 can then operate as an output waveguide. The angular grating performs exactly the same selective coupling between the incoming incident free space electromagnetic radiation carrying OAM and a guided wave propagating in the resonator as for the OAM generator described above.

By coupling the output waveguide to a photo-detector it becomes possible to detect one or more OAM states of the incident radiation.

This opens up a very wide range of applications for the technology, a few of which will be briefly described below and are not intended as an exhaustive list of potential applications. Due to the extremely compact size of the OAM emitter/receive device (may be less than 10 µm in diameter), one dimensional or two dimensions arrays of the devices may be provided, which are not currently possible with existing technology that tends to be approximately 3 orders of magnitude greater in dimension. A particularly beneficial aspect of the OAM emitter/receiver device is that it can provide very fast reconfigurability at speeds of nano-second or faster.

Optical tweezer systems are known which can impart angular momentum to a trapped particle, resulting in spin in the particle. Such spin can be controlled by the sign and amount of OAM carried by the beam. This may result in the change of physical signatures of these particles (e.g., its luminescence spectrum, its magnetic properties if the particle is charged). In such an optical tweezer system the size and cost of the system could be reduced significantly using a device according to the invention. New types of optical tweezer systems could also be envisaged as the radiation emission source could be integrated closer to a sample due to its very small size.

In the field of quantum communications the light carrying OAM may be used to encode the quantum information, for instance in any quantum communication channel where quantum superposition states, entangled states or any other quantum states are communicated between multiple parties. OAM quantum communications channels can be realised between two chips, each containing the same integrated OAM PIC, or an array of OAM emitters/receivers on a chip.

A compact OAM source and detector realised by a device according to the invention could lead to a reduction in the size of a system and the development of handheld quantum key distribution devices.

Figure 4:
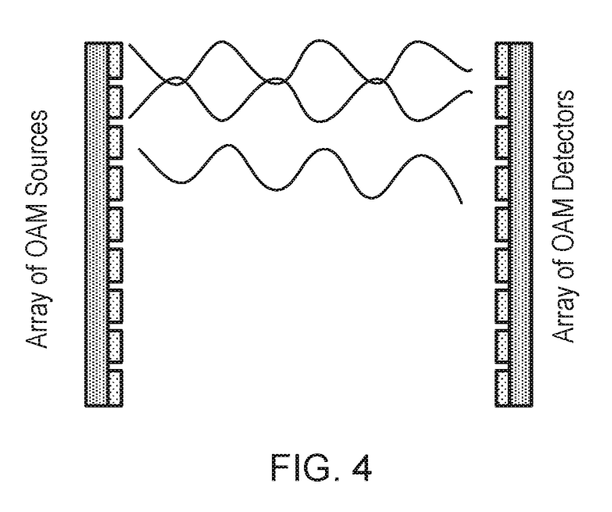
FIG. 4 illustrates an application of the invention in an optical interconnect using an array of OAM sources and detectors.

For optical interconnect technology there is the potential to increase the capacity of the communication system using an array of OAM sources and detectors (due to unlimited OAM states) each provided by a device according to the invention, as shown in FIG. 4.

The OAM device may also be configured as a storage device for the OAM quantum state carried by the incident radiation beam, with the Q-factor of the resonator cavity deciding the decay rate/lifetime of the stored state. The same angular grating, which serves as the input coupling mechanism, will couple the light out of the guided wave back into the beam, shortening the cavity photon lifetime.

It is possible to fabricate angular gratings that can be electrically (through electro-optical effect) or optically (through photo-refractive effect or Kerr effect, for example) controlled, so that the grating only exists during writing (input coupling) and reading (output coupling), while it is erased during the storage period to increase the cavity Q-factor.

It is possible for a high intensity guided wave mode to generated photons of different frequencies using nonlinear optical processes (such as spontaneous four wave mixing—FWM)—the high Q factor of the resonator cavity enables high efficiency in nonlinear optical processes. The generated photons will be emitted into two different OAM beams. These two OAM states should be entangled and can be spatially separated using optical bandpass filters.

Figure 5:
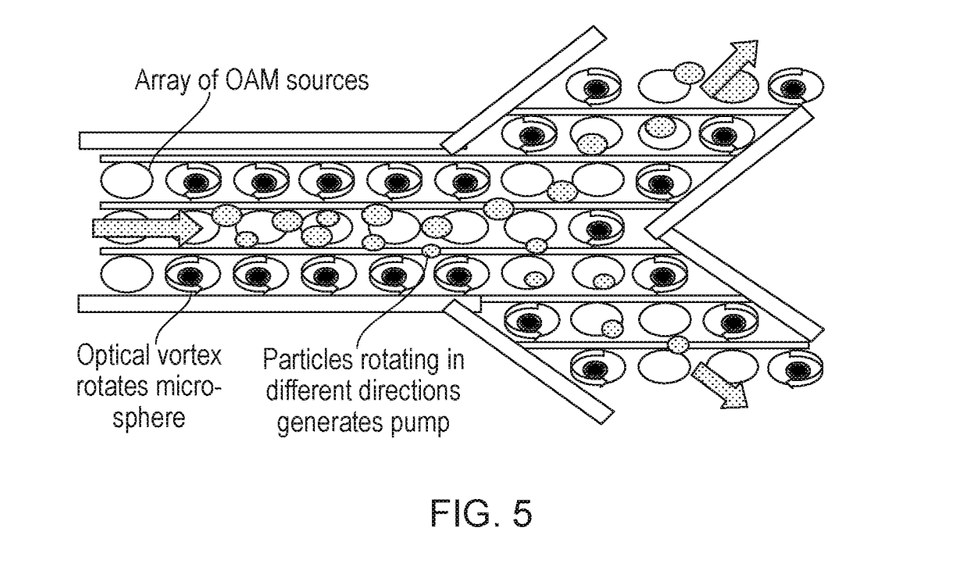
FIG. 5 illustrates another application of the invention in a microfluidic device for sorting microparticles.

Arrays of OAM emission sources could be used to generate optical vortices so as to form controllable and reconfigurable drivers for micro-fluidic and nano-particle manipulation machines. For example, FIG. 5 illustrates a system for rotating microspheres by switching on an array of OAM sources below the microparticles. The source organizes fluid-borne colloidal particles into rapidly circulating rings, thereby generating fluid flows with pinpoint control and no moving parts. The vortex created acts to pump the particles through the device. The device can be configured using different OAM states to sort particles. This has applications in sensing, chemical analysis, quantum science etc., and enables label-free cell sorting "lab on a chip" technology.

Although the invention has been described above with reference to one or more preferred embodiments, it will be appreciated that various changes or modifications may be made without departing from the scope of the invention as defined in the appended claims.

The invention claimed is:

1. A method of generating electromagnetic radiation carrying orbital angular momentum (OAM), the method comprising placing an electromagnetic wave in a resonator having a closed-loop waveguide supporting a guided wave propagating at resonance with angular order, p, and with an angular grating patterned in the closed-loop waveguide, the angular grating having a integer number, q, of grating elements, wherein the angular grating selectively couples the guided wave mode to a free space radiation mode having an OAM quantity, l, and out-of-plane wave vector component, $k_{rad,z}$, and wherein significant coupling to the grating occurs only when the following wave matching condition is satisfied:

$$l=p-mq$$

where:
   m is the diffraction order of the angular grating, m=1, 2, 3, . . . ,.

2. A method according to claim 1, wherein the resonator includes a plurality of the angular gratings patterned in the closed-loop waveguide, each angular grating having a different integer number, q, of grating elements such that the free space radiation mode has a plurality of OAM quantities, l.

3. A method according to claim 1, wherein the guided wave mode has an angular wave vector, $k_{guide}$, and the free space radiation mode has a wave vector, $k_{rad}$, with angular component, $k_{rad,\theta}$, and out-of-plane component, $k_{rad,z}$, and wherein the wave matching condition translates to:

$$k_{rad,\theta}=k_{guide}-mq/R=k_{guide}-m2\pi/\Lambda$$

where:
   R is the effective radius of the angular grating where it interacts with the guided wave,
   $k_{guide}=p/R$, and
   $\Lambda$ is the period of the angular grating at R.

4. A method according to claim 1, wherein the electromagnetic radiation carrying OAM is a beam having a beam axis substantially perpendicular to the plane of the guided wave.

5. A method according to claim 1, wherein the electromagnetic radiation carrying OAM has a helical mode with non-zero OAM when p≠q.

6. A method according to claim 5, wherein the electromagnetic radiation has a helical wave-front inclined at an angle, φ, to the guided wave plane normal.

7. A method according to claim 1, wherein the electromagnetic wave is coupled into the closed-loop waveguide from an input waveguide.

8. A method according to claim 7, wherein the input electromagnetic wave is coupled into one or both propagation directions in the closed-loop waveguide resonator.

9. A method according to claim 7, wherein the input electromagnetic wave is substantially TE polarized, or s-polarized, in which its electric field vector lies substantially in the plane of the guided wave.

10. A method according claim 1, further comprising tuning the wavelength of the input electromagnetic wave so that its wavelength aligns with one or more of the resonance modes of the resonator.

11. A method according to claim 10, wherein the tuning step is used to control the OAM quantum number, l, of the electromagnetic radiation carrying OAM.

12. A method according to claim 1, further comprising tuning the resonance modes of the resonator, whilst maintaining the wavelength of the input electromagnetic wave substantially constant, wherein tuning the resonance modes of the resonator includes changing a refractive index and/or a dimension of the resonator such that the input wavelength aligns with one or more of the resonance modes of the resonator.

13. A method of detecting or manipulating electromagnetic radiation carrying orbital angular momentum (OAM), the method comprising receiving incoming electromagnetic radiation carrying OAM at a resonator having a closed-loop waveguide with an angular grating patterned in the closed-loop waveguide, the angular grating having a integer number, q, of grating elements, wherein the angular grating selectively couples the incoming incident electromagnetic radiation having an OAM quantity, l, and out-of plane wave vector component, $k_{rad,z}$, from a free space mode to a guided wave mode propagating in the closed-loop waveguide at resonance with angular order, p, the method further comprising detecting or manipulating the guided wave, wherein significant coupling to the grating occurs only when the following wave matching condition is satisfied:

$$l=p-mq$$

where:
  m is the diffraction order of the angular grating, m=1, 2, 3, . . . ,.

14. A method according to claim 13, wherein the resonator includes a plurality of the angular gratings patterned in the closed-loop waveguide, each angular grating having a different integer number, q, of grating elements such that a plurality of OAM quantities, l, in the incoming incident radiation are each selectively coupled to a guided wave mode by the respective grating.

15. A method according to claim 13, wherein the guided wave mode has an angular wave vector, $k_{guide}$, and the free space radiation mode has a wave vector, $k_{rad}$, with angular component, $k_{rad,\theta}$, and out-of-plane component, $k_{rad,z}$, and wherein the wave matching condition translates to:

$$k_{rad,\theta}=k_{guide}-mq/R=k_{guide}-m2\pi/\Lambda$$

where:
  R is the effective radius of the angular grating where it interacts with the guided wave,
  $k_{guide}=p/R$, and
  $\Lambda$ is the period of the angular grating at R.

16. A method according to claim 13, further comprising coupling the guided wave from the closed-loop waveguide to a detector thereby detecting the incident electromagnetic radiation carrying OAM.

17. A method according to claim 16, wherein the step of coupling the electromagnetic wave from the closed-loop waveguide to the detector is via an output waveguide.

18. A method according to claim 13, wherein the incident electromagnetic radiation carrying OAM is a beam having a beam axis substantially perpendicular to the plane of the guided wave.

19. A method according to claim 13, wherein the incident electromagnetic radiation carrying OAM has a helical mode with nonzero OAM such that p≠q.

20. A method according to claim 19, wherein the incident electromagnetic radiation has a helical wave-front inclined at an angle, φ, to the guided wave plane normal.

21. A method according to claim 13, further comprising tuning the resonance modes of the resonator by changing a refractive index and/or a dimension of the resonator such that the incoming electromagnetic radiation of substantially constant wavelength is aligned with one or more of the resonance modes of the resonator whereby to selectively detect electromagnetic radiation carrying specific OAM quantum numbers, l.

22. A device for generating and/or detecting and/or manipulating electromagnetic radiation carrying orbital angular momentum (OAM), the device comprising a resonator including a closed-loop waveguide for supporting a guided wave propagating at resonance with angular order, p, and with an angular grating patterned in the closed-loop waveguide, the angular grating having a integer number, q, of grating elements, wherein the angular grating is arranged to selectively couple the guided wave mode to a free space radiation mode having an OAM quantity, l, and out-of-plane wave vector component, $k_{rad,z}$, and wherein significant coupling to the grating occurs only when the following wave matching condition is satisfied:

$$l=p-mq$$

where:
  m is the diffraction order of the resonator, m=1, 2, 3, . . . ,.

23. A device according to claim 22, wherein the resonator includes a plurality of the angular gratings patterned in the closed-loop waveguide, each angular grating having a different integer number, q, of grating elements, and wherein each angular grating is arranged to selectively couple a guided wave mode to a free space radiation mode having a different respective OAM quantity, l.

24. A device according to claim 22, wherein the guided wave mode has an angular wave vector, $k_{guide}$, and the free space radiation mode has a wave vector, $k_{rad}$, with angular component, $k_{rad,\theta}$, and out-of-plane component, $k_{rad,z}$, and wherein the wave matching condition translates to:

$$k_{rad,\theta}=k_{guide}-mq/R=k_{guide}-m2\pi/\Lambda$$

where:
  R is the effective radius of the angular grating where it interacts with the guided wave,
  $k_{guide}=p/R$, and
  $\Lambda$ is the period of the angular grating at R.

25. A device according to claim 24, wherein R is less than 100 μm, preferably less than 50 μm, preferably less than 20 μm, preferably less than 10 μm.

26. A device according to claim 22, further comprising an input/output waveguide for coupling an electromagnetic wave to/from the closed-loop waveguide.

27. A device according to claim 22, wherein the closed-loop waveguide is a ring or a disc, or is substantially spherical.

28. A device according to claim 22, wherein the resonator is incorporated in an integrated circuit (IC).

29. A device according to claim 28, wherein the IC includes an array of the resonators.

30. A device according to claim 22 for generating light carrying OAM, wherein the resonator is an optical resonator and further comprising a laser source coupled to the optical resonator.

31. A device according to claim 30, wherein the laser source is tunable.

32. A device according to claim 22 for generating electromagnetic radiation carrying OAM, further comprising a polarization controller for coupling a TE polarized, or s-polarized, electromagnetic wave into the closed-loop waveguide, in which the electric field vector of the electromagnetic wave lies substantially in the plane of the guided wave.

33. A device according to claim 22 for detecting light carrying OAM, wherein the resonator is an optical resonator and further comprising a photo-detector coupled to the optical resonator.

* * * * *